US009231847B2

(12) United States Patent
Lim

(10) Patent No.: US 9,231,847 B2
(45) Date of Patent: Jan. 5, 2016

(54) APPARATUS AND METHOD FOR PROCESSING PACKET FOR ROUTING AND VERIFYING PATH IN DOMAINS

(71) Applicant: Electronics and Telecommunications Research Institute, Daejeon-si (KR)

(72) Inventor: Chang-Gyu Lim, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 84 days.

(21) Appl. No.: 14/081,490

(22) Filed: Nov. 15, 2013

(65) Prior Publication Data

US 2014/0198791 A1 Jul. 17, 2014

(30) Foreign Application Priority Data

Jan. 16, 2013 (KR) ........................ 10-2013-0005057

(51) Int. Cl.
*H04L 12/26* (2006.01)
*H04L 12/28* (2006.01)
*H04L 12/701* (2013.01)
*H04L 29/06* (2006.01)
*H04L 12/715* (2013.01)

(52) U.S. Cl.
CPC .............. *H04L 45/00* (2013.01); *H04L 63/123* (2013.01); *H04L 45/04* (2013.01)

(58) Field of Classification Search
None
See application file for complete search history.

(56) References Cited

U.S. PATENT DOCUMENTS

| 6,745,333 | B1* | 6/2004 | Thomsen ........................ 726/23 |
| 7,401,217 | B2* | 7/2008 | Huang et al. .................. 713/153 |
| 2007/0022469 | A1* | 1/2007 | Cooper et al. ..................... 726/3 |
| 2007/0180227 | A1* | 8/2007 | Akimoto ....................... 713/153 |
| 2008/0244739 | A1* | 10/2008 | Liu et al. .......................... 726/22 |
| 2009/0037713 | A1* | 2/2009 | Khalid et al. ..................... 713/1 |
| 2013/0305044 | A1* | 11/2013 | Gutt et al. ..................... 713/160 |

FOREIGN PATENT DOCUMENTS

KR 10-2005-0021123 A 3/2005

* cited by examiner

*Primary Examiner* — Chi H Pham
*Assistant Examiner* — Soon-Dong D Hyun
(74) *Attorney, Agent, or Firm* — Rabin & Berdo, P.C.

(57) ABSTRACT

Disclosed are an apparatus and method for processing a packet for routing and verifying a path in a domain. The apparatus for processing the packet includes an authentication processing unit configured to authenticate a transmission path of a packet in a corresponding node inside a domain; and a transmission processing unit configured to verify whether or not authentication has been performed such that a reception packet passes through the corresponding node and whether or not the packet has passed through an immediately previous node that is passed through along the transmission path and transmit the packet.

13 Claims, 3 Drawing Sheets

APPARATUS AND METHOD FOR PROCESSING PACKET FOR ROUTING AND VERIFYING PATH IN DOMAINS

CROSS-REFERENCE TO RELATED APPLICATION

This application claims priority to and the benefit of Korean Patent Application No. 10-2013-0005057, filed on Jan. 16, 2013, the disclosure of which is incorporated herein by reference in its entirety.

BACKGROUND

1. Field of the Invention

The present invention relates to a network technique and more specifically relates to a technique of transmitting a packet among nodes in the network.

2. Discussion of Related Art

The Internet is divided into units of several domains, and nodes in the domains are configured of ingress nodes to which packets are input, egress nodes from which packets are output, and transit nodes which are middle nodes which transfer packets from ingress nodes to egress nodes, and there may be one or more transit nodes.

Accordingly, it is required to set a transmission packet among nodes inside the domains and to perform reliable packet transmission in the set transmission packet. That is, architecture capable of performing communication having high reliability in the domain is required.

SUMMARY OF THE INVENTION

According to one embodiment, there is provided a packet processing apparatus and method for routing and verifying a path in a domain to perform reliable packet transmission inside the domain.

An apparatus for processing a packet according to one embodiment includes: an authentication processing unit configured to authenticate a transmission path of the packet in a corresponding node in a domain; and a transmission processing unit configured to verify whether or not to authentication such that a reception packet passes through the corresponding node has been performed and whether or not an immediately previous node that should be passed through along the transmission path has been passed through and transmit the packet.

If the authentication for the transmission path is requested from a path server providing routing information, the authentication processing unit may authenticate the transmission path so that the packet passes through the corresponding node and thereafter share a routing ID value of the authenticated transmission path with the other node and add the corresponding routing ID value to a routing table.

The transmission processing unit may insert the routing ID value to which the transmission path is set and a path verification value thereto into a header of a transmission packet, and thereafter transmit the transmission packet to the next node. The path verification value may be a value which is obtained by encrypting the routing ID value into a private key value of the corresponding node. The length of the header of the transmission packet may have a predetermined size regardless of the type or the number of the node over the transmission path.

The transmission processing unit may include a packet authentication determination unit configured to determine whether or not authentication such that the reception packet passes through the corresponding node has been performed; a packet path verification determination unit configured to determine whether or not the reception packet has passed through the immediately previous node that should be passed through along the transmission path if the reception packet is authenticated by the packet authentication determination unit; and a header path verification correction unit configured to correct the header so that the path of the transmission packet can be verified in the next node along the transmission path when the packet path verification determination unit has confirmed that the reception packet has passed through the immediately previous node that should be passed through.

The packet authentication determination unit may retrieve the routing ID of the reception packet in a routing table to authenticate the reception packet and confirm the immediately previous that should be passed through along the transmission path having the retrieved routing ID.

The packet path verification determination unit may acquire a public key of the immediately previous node that should be passed through along the transmission path from an encryption key table, and thereafter confirm the encrypted path verification value of the reception packet using the acquired public key.

The header path verification correction unit may encrypt a new path verification value using a private key so that the path verification can be performed on the next node, and then correct the header of the corresponding packet by inserting the encrypted path verification value into the header of the transmission packet.

A method of processing a packet of a node according to another embodiment includes: determining packet authentication to determine whether or not authentication such that a reception packet passes through a corresponding node has been performed; verifying and determining a packet path such that, according to the result of the packet authentication determination, if the reception packet is not authenticated, the packet is dropped, and if the reception packet is authenticated, it is determined whether or not the packet has passed through the immediately previous node that should be passed through along a transmission path; and verifying and correcting the header path such that, according to the result of the packet path verification determination, if the packet has not passed through the immediately previous node that should be passed through, the packet is dropped, and if the packet has passed through the node, a header of the transmission packet is corrected to enable the path of the packet to be verified in the next node along the transmission path.

The determining of the packet authentication may include retrieving a routing ID of the reception packet in a routing table to authenticate the reception packet, and then confirming the immediately previous node which has the retrieved routing ID and that should be passed through along the transmission path.

The determining of the packet path verification may include acquiring a public key of the immediately previous node that should be passed through along the transmission path from an encryption key table and thereafter using the acquired public key, and confirming the encrypted path verification value of the reception packet.

The correcting of the header path verification may include encrypting a new path verification value using a private key of the corresponding node to enable the path verification to be performed in the next node and then correcting a header of the corresponding packet by inserting the encrypted path verification value into the header of the transmission packet.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be obvious to those of ordinary skill in the art.

Also, descriptions of well-known functions and constructions may be omitted for increased clarity and conciseness.

Hereinbelow, the invention will be described to enable a skilled person in the art to readily understand and reproduce the invention through preferred embodiments with reference to the accompanying drawings.

In the following description, a more detailed description of functions and configurations which are well known and related to the invention will be omitted when it is determined that description thereof would make the gist of the embodiments according to the invention unclear.

The terms used throughout the specification of the invention are terms defined in consideration of functions of embodiments according to the invention and can be sufficiently modified according to an intention, a custom or the like of a user or an operator, and therefore definitions of the terms should be determined based on the content throughout the present specification.

Figure 1:
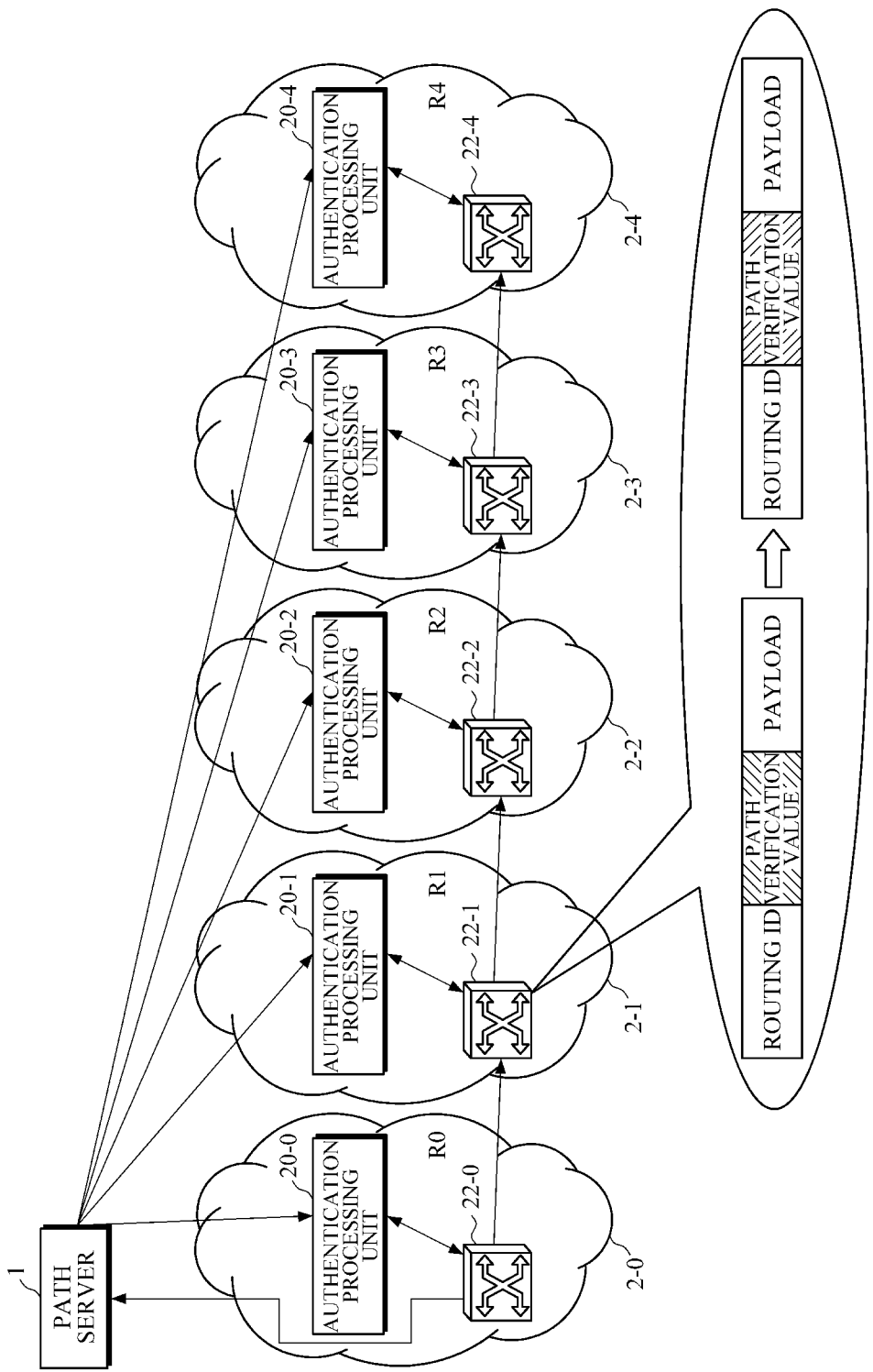
FIG. 1 is a configuration diagram of a path server and a node which are configured to transmit a packet in a domain according to one embodiment of the invention.

FIG. 1 is a configuration diagram of a path server (1) and nodes (2-0, 2-1 . . . 2-4) which perform packet transmission in a domain according to one embodiment of the invention.

Referring to FIG. 1, a network system of the invention may include the path server (1) and the plurality of nodes (2-0, 2-1 . . . 2-4) through which transmission packets pass. In FIG. 1, five nodes are illustrated to facilitate the convenience of the description, but the nodes are not limited thereto.

Each node (2-0, 2-1 . . . 2-4) may includes an authentication processing unit (20-0, 20-1 . . . 20-4) for authenticating a specific transmission packet in the corresponding node, and a transmission processing unit (22-0, 22-1 . . . 22-4) configured to process the packet transmission in the corresponding node. The transmission processing units (22-0, 22-1 . . . 22-4) are positioned in a data plane of each node (2-0, 2-1 . . . 2-4) so as to transmit data.

An R0 node (2-0) that is an ingress node requests path information between the R0 node (2-0) and a R4 node (2-4) that is an egress node from the path server (1). The path server (1) calculates an optimum path between the R0 node (2-0) and the R4 node (2-4). The optimum path in FIG. 1 is R0→R1→R2→R3→R4.

Since all nodes which participate in the packet transmission enable to perform the packet transmission through only the authenticated transmission path, the path server (1) requests the authentication of the corresponding path to each of authentication processing units (20-0, 20-1 . . . 20-4) of the R0 to R4 nodes (2-0, 2-1 . . . 2-4). The authentication processing units (20-0, 20-1 . . . 20-4) in which the path authentication is requested authenticate the corresponding path, accept the path request, share the authenticated routing ID value (A) among the R0 to R4 nodes (2-0, 2-1 . . . 2-4) in the corresponding path, and add the corresponding routing ID value (A) to the routing table of each corresponding node. Thereby, it can be confirmed that the transmission path is connected in paths which are similar to each other by the routing ID values which are similar to each other in the routing tables in each node.

According to one embodiment, with respect to the R0 node (2-0), information with regard to the immediately previous transmission node through which the reception packet passed and the next reception node is contained in an attribute managed together with the routing ID value (A) of the R0 node (2-0). That is, the R0 node (2-0) is an ingress node, and therefore the immediately previous transmission node is NULL and the next reception node is the R1 node (2-1). Similarly, the transmission node and the reception node of the R1 node (2-1) are the R0 node (2-0) and the R2 node (2-2), respectively.

According to one embodiment, the transmission processing unit (22-0) of the R0 node (2-0) inserts the routing ID value (A) and the path verification value to the header of the packet which is actually transmitted using the value managed at the routing table. The path verification value may be a value which is obtained by encrypting the routing ID value (A) into a private key value of the corresponding node. The public key can be used to confirm the encrypted path verification value. Subsequently, the transmission processing unit (22-0) of the R0 node (2-0) transmits the transmission packet in which the routing ID value (A) and the path verification value are inserted to the header through a data/forwarding plane to the next node.

Figure 2:
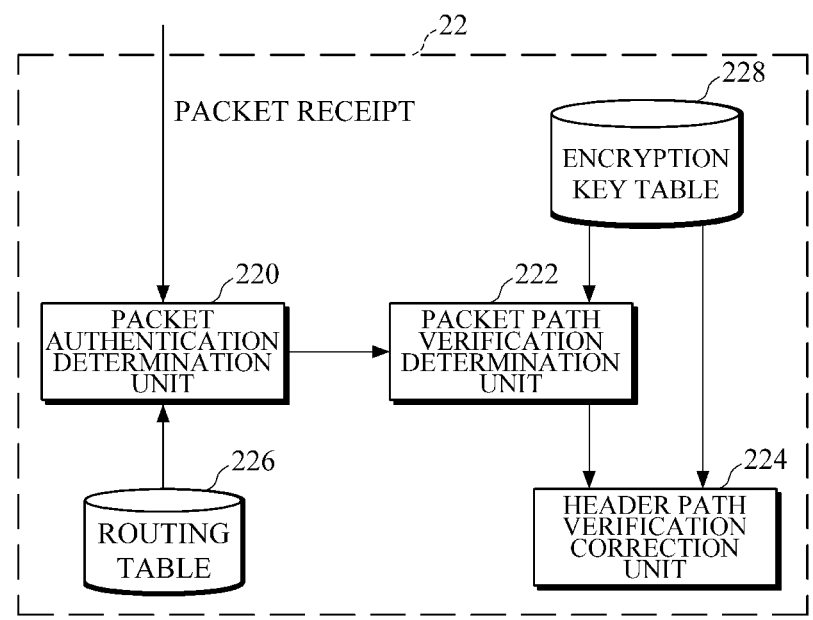
FIG. 2 is a detailed configuration diagram of a transmission processing unit according to one embodiment of the invention.

FIG. 2 is a detailed configuration diagram of the transmission processing unit (22) according to one embodiment of the invention.

Referring to FIG. 1 and FIG. 2, the transmission processing unit (22) includes a packet authentication determination unit (220), a packet path verification determination unit (222), a header path verification correction unit (224), a routing table (226) and an the encryption key table (228).

The packet authentication determination unit (220) confirms whether or not the reception packet is authenticated to pass through the node by comparing an index of the routing table (226). As a result of the packet authentication, when the packet is not authenticated, the packet is dropped.

The packet path verification determination unit (222) confirms whether or not the reception packet has passed through the immediately previous node through which it should have passed along the transmission path. If the packet has not passed through the immediately previous node through which it should have passed, the packet is dropped.

Before the header path verification correction unit (224) transmits the packet to the next node, the header of the packet is corrected so that the next node can verify the path of the packet. The routing table (226) stores a routing ID index, and the encryption key table (228) stores the encryption key information.

Below, in the node which receives the packet, functions of the specific configuration elements of the aforementioned transmission processing unit (22) will be described in detail.

The packet authentication determination unit (220) retrieves the routing ID of the reception packet in the routing table (226) and finds a transmission node which corresponds to the retrieved routing ID, that is, which is the immediately previous stage of the path through which the packet should have passed. Then the packet path verification determination unit (222) acquires the public key of the node of the immediately previous stage through which the packet should have passed from the encryption key table (228), and thereafter the encrypted path verification value of the reception packet is confirmed. Subsequently, the header path verification correction unit (224) calculates the new path verification value using the private key of the corresponding node so that the path verification is performed in the next node, and thereafter inserts the calculated value to the header of the transmission packet. The packet is transmitted until it reaches a destination registered by the aforementioned method. The portion in which the path verification value of the packet header is corrected by the header path verification correction unit (224) can be confirmed through the packet structure of FIG. 1.

Figure 3:
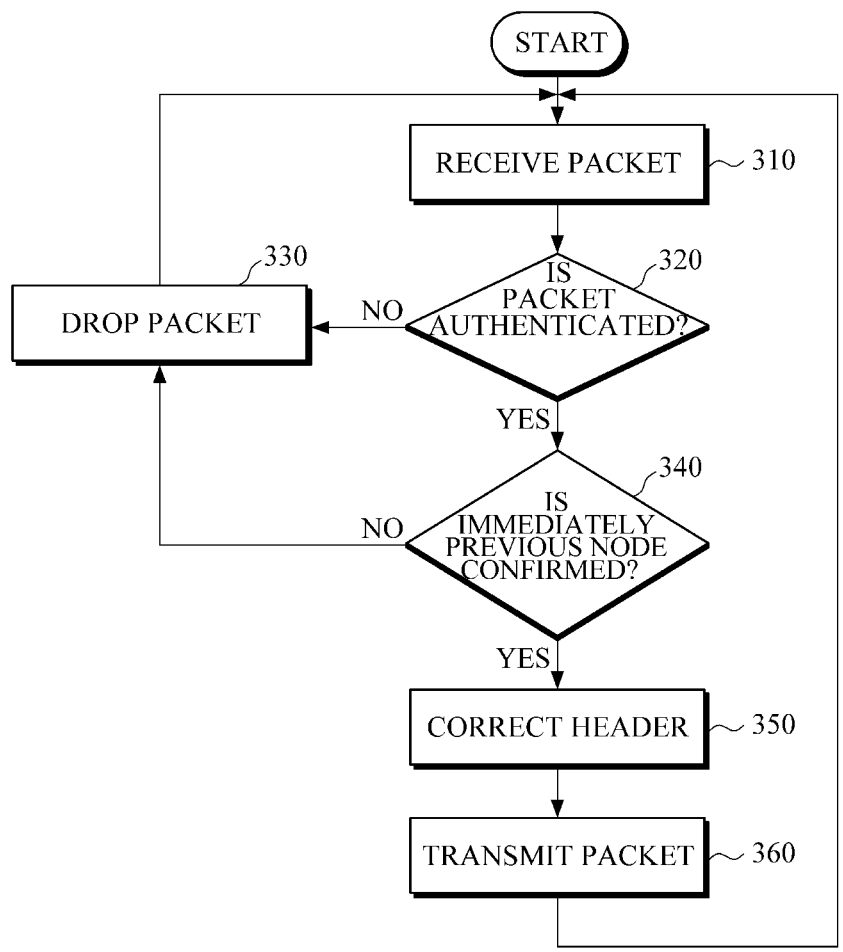
FIG. 3 is a flowchart illustrating a highly reliable packet processing method for routing and verifying a path inside a domain according to one embodiment of the invention.

FIG. 3 is a flowchart illustrating a highly reliable packet processing method of routing and verifying a path inside a domain according to one embodiment of the invention.

Referring to FIG. 2 and FIG. 3, if a node receives a packet, the packet is transmitted to the packet authentication determination unit (220) of the transmission processing unit (22) (310). Then the packet authentication determination unit (220) confirms whether or not authentication such that the reception packet passes through the corresponding node has been performed (320). Then the packet path verification determination unit (222) confirms whether or not the packet has passed through the node of the immediately previous stage through which it should have passed (340). As a result of the confirmations, if there is anything wrong with the packet, the received packet is dropped (330). On the other hand, if there is nothing wrong with the packet, the header of the packet is corrected so that the next node can verify the path of the packet (350). If the header correction is completed, the packet is transmitted to the next node (360).

As described above, the apparatus and method for processing the packet for routing and verifying the path with high reliability in the domain enable the packet to be reliably transmitted by providing a method of confirming whether or not authentication to pass through the corresponding node has been performed and whether or not the packet has passed through the node of the immediately previous stage through which it should have passed. Further, if the length of the header is varied according to the number of nodes through which the packet has passed, there is a problem that a processing time in the data plane increases and an overhead which is occupied by a header in the whole of the packet also increases, and therefore a predetermined length of the header is used in the invention.

According to the one embodiment, the provision of the method of confirming whether or not authentication such that the packet passes through the corresponding node in the domain has been performed and whether or not the node of the immediately previous stage that should be passed through enables the packet to be reliably transmitted.

Further, if the length of the header is varied according to the number of the passed nodes, problems in which the processing time in the data plane increases and the overhead which is occupied by the header in the whole of the packet increases occur, and therefore a predetermined length of the header is used in the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for processing a packet of a node, comprising:
   an authentication processing unit configured to authenticate a transmission path of the packet in a corresponding node in a domain; and
   a transmission processing unit configured to verify whether or not authentication such that a reception packet passes through the corresponding node has been performed and whether or not the packet has passed through an immediately previous node of an authenticated transmission path including the corresponding node and the immediately previous node that is passed through along the transmission path and transmit the packet.

2. The apparatus according to claim 1, wherein the authentication processing unit authenticates the transmission path so that the packet passes through the corresponding node if the authentication for the transmission path is requested from a path server providing path information, and shares a routing ID (identification) value of the authenticated transmission path with the other node and adds the corresponding routing ID value to a routing table.

3. The apparatus according to claim 1, wherein the transmission processing unit inserts a routing ID (identification) value to which the transmission path is set and a path verification value thereto into a header of a transmission packet, and thereafter transmits the transmission packet to the next node.

4. The apparatus according to claim 3, wherein the path verification value is a value which is obtained by encrypting the routing ID value into a private key value of the corresponding node.

5. The apparatus according to claim 3, wherein a length of the header of the transmission packet has a predetermined size regardless of the types or number of the nodes along the transmission path.

6. The apparatus according to claim 1, wherein the transmission processing unit includes;
   a packet authentication determination unit configured to determine whether or not authentication such that the reception packet passes through the corresponding node has been performed,
   a packet path verification determination unit configured to determine whether or not the reception packet has passed through the immediately previous node that is passed through along the transmission path if the reception packet is authenticated by the packet authentication determination unit, and
   a header path verification correction unit configured to correct the header so that the path of the transmission packet can be verified in the next node along the transmission path if the packet path verification determination unit has confirmed that the reception packet has passed through the immediately previous node that is passed through.

7. The apparatus according to claim 6, wherein the packet authentication determination unit retrieves a routing ID (identification) of the reception packet in a routing table to authenticate the reception packet and confirms the immediately previous node that is passed through along the transmission path having the retrieved routing ID.

8. The apparatus according to claim 6, wherein the packet path verification determination unit acquires a public key of the immediately previous node that is passed through along the transmission path from an encryption key table, and thereafter confirms the encrypted path verification value of the reception packet using the acquired public key.

9. The apparatus according to claim 6, wherein the header path verification correction unit encrypts a new path verification value using a private key so that the path verification can be performed in the next node, and then corrects the header of the corresponding packet by inserting the encrypted path verification value into the header of the transmission packet.

10. A method of processing a packet of a node, comprising:
determining packet authentication to determine whether or not authentication has been performed such that a reception packet passes through a corresponding node;
verifying and determining a packet path such that, according to the result of the packet authentication determination, if the reception packet is not authenticated, the packet is dropped, and if the reception packet is authenticated, it is determined whether or not the packet has passed through the immediately previous node that is passed through along a transmission path; and
verifying and correcting the header path such that, according to the result of the packet path verification determination, if the packet has not passed through the immediately previous node that is passed through, the packet is dropped, and if the packet has passed through the immediately previous node, a header of a transmission packet is corrected to enable the path of the packet to be verified in the next node along the transmission path.

11. The method according to claim 10, wherein the determining of the packet authentication includes retrieving a routing ID of the reception packet in a routing table to authenticate the reception packet, and confirming the immediately previous node which has the retrieved routing ID and which is passed through along the transmission path.

12. The method according to claim 10, wherein the determining of the packet path verification includes acquiring the public key of the immediately previous node that is passed through along the transmission path from an encryption key table and thereafter using the acquired public key, and confirming the encrypted path verification value of the reception packet.

13. The method according to claim 10, wherein the correcting of the header path verification includes encrypting a new path verification value using the private key of the corresponding node to enable the path verification in the next node and then correcting the header of the corresponding packet by inserting the encrypted path verification value into the header of the transmission packet.

* * * * *